United States Patent [19]

Natale et al.

[11] Patent Number: 4,818,970
[45] Date of Patent: Apr. 4, 1989

[54] FIRE CONDITION DETECTION AND CONTROL SYSTEM FOR AIR MOVING AND FILTERING UNITS

[75] Inventors: Anthony Natale, Mt. Holly; Eugene E. Newman, Maple Shade; Thomas Natale, Morrestown, all of N.J.

[73] Assignee: GPAC, Inc., Cinnaminson, N.J.

[21] Appl. No.: 84,763

[22] Filed: Aug. 13, 1987

[51] Int. Cl.4 .......................... G08B 1/08; A62C 37/18
[52] U.S. Cl. ..................................... 340/539; 340/532; 340/588; 340/825.06; 236/21 R; 236/89; 236/DIG. 9; 98/40.06; 98/40.25; 169/61
[58] Field of Search ............... 340/539, 588, 589, 584, 340/585, 586, 628–630, 825.06, 532, 648, 531; 236/1 B, 21 R, 11, 67, 89, 36, 94, DIG. 9, DIG. 3, DIG. 19; 318/16, 565, 334, 471, 490; 98/2.01, 2.11, 40.06, 40.25, 29; 169/23, 59, 60, 61; 55/217

[56] References Cited

U.S. PATENT DOCUMENTS

| 3,826,180 | 7/1974 | Hayashi | 98/43 |
| 3,926,101 | 12/1975 | Moss | 98/33 R |
| 4,063,595 | 12/1977 | Phillips | 169/60 |
| 4,160,246 | 7/1979 | Martin et al. | 340/630 |
| 4,177,461 | 12/1979 | Brown et al. | 340/628 |
| 4,211,362 | 7/1980 | Johnson | 340/630 |
| 4,276,064 | 6/1981 | Gerdes | 52/217 |
| 4,308,911 | 1/1982 | Mandl | 340/506 |
| 4,363,031 | 12/1982 | Reinowitz | 340/539 |
| 4,375,637 | 3/1983 | Desjarding | 340/506 |
| 4,391,913 | 7/1983 | Keldmann | 236/36 |
| 4,531,114 | 7/1985 | Topol et al. | 340/539 |
| 4,594,580 | 6/1986 | Nelson | 340/539 |
| 4,604,111 | 8/1986 | Natale | 55/97 |
| 4,637,473 | 1/1987 | Gillis et al. | 169/61 |
| 4,659,909 | 4/1987 | Knutson | 219/452 |
| 4,675,203 | 6/1987 | Scarbrough | 427/27 |
| 4,742,763 | 5/1988 | Holter et al. | 98/2.01 |

Primary Examiner—Donnie L. Crosland
Attorney, Agent, or Firm—Fleit, Jacobson, & Price

[57] ABSTRACT

A fire condition detection and control system for use with air moving and filtering units. The system includes one or more remote fire condition detection units, which sense heat or smoke and, upon such sensing, transmit a signal indicative of an alarm condition to one or more air moving and filtering units located within a containment area. The transmission is by wireless radio frequency transmission and/or a wired transmission line or cable. The air moving and filtering units detect the alarm condition and disconnect power to the blower motor of the air moving and filtering unit. The receiver and control circuitry may be integral with the air moving and filtering unit, or may be part of a separate control unit that plugs into conventional air moving and filtering units.

23 Claims, 2 Drawing Sheets

FIRE CONDITION DETECTION AND CONTROL SYSTEM FOR AIR MOVING AND FILTERING UNITS

BACKGROUND OF THE INVENTION

In the removal of asbestos and other particulate contamination, a work area, or containment area, is defined utilizing either the existing walls of a building in combination with plastic sheeting, or by providing walls of plastic sheeting to surround a source of particulate contamination. Entranceways into the containment area are provided, typically through a decontamination chamber connected to the containment area. An air inlet is typically provided to allow air to enter the containment area, preferably through the decontamination chamber.

At least one air moving machine with filtering media therein is located with respect to the containment area to draw high volumes of air into the area. In some cases, the air moving machine is located outside the work area in air flow communication with the work area. The air moving machine draws large volumes of air into the containment area, filters the air, and exhausts the air outside of the work area, or, in some instances, may recirculate air within the containment area. In some cases, several such air moving machines are used to move air into and out of a containment area, depending on the size of the area. Each machine is capable of moving as much as 2,000 CFM of air, the number of air moving machines being sufficient to change the air as often as every 5 minutes.

As described in U.S. Pat. No. 4,604,111, a system and method for removing asbestos is known which minimizes the risk of airborne contamination in a containment area from which asbestos is removed and prevents the escape of contaminated air from the area. This system and method, known as the negative pressure method, provides for defining a containment area that is substantially sealed but has an opening in the area so that relatively large volumes of air can be drawn into the work area by an air moving and filtering unit, which unit filters the air and exhausts the cleansed air outside of the work area.

The air moving and filtering machine, as described in the above-mentioned patent, is capable of drawing relatively high volumes of air into the work area, thereby creating a negative pressure in the work area to prevent any airborne asbestos fibers from leaking outside. By drawing relatively large volumes of air into the work area, the work area is substantially cleansed, thus minimizing workers' risk of exposure to airborne asbestos fibers.

Such an air moving and filtering unit, as described in the aforementioned patent, includes a housing having a blower for drawing air into the housing through an air inlet and filtering the air through filters located therein. After filtering, the air is expelled outwardly from the housing, preferably through a hose arrangement that is associated with a wall of the substantially enclosed containment area, to allow the cleansed air to exit the area. An example of an air moving and filtering unit is manufactured by Microtrap, Inc., of Maple Shade, N.J.

The large amount of air movement created by these air moving and filtering units may present a potential safety hazard in the event of a fire occurring inside or outside the work area. If a fire is within the work area, the air moving machines may fan the fire and accelerate its spread and the intensity of heat and smoke produced. Meanwhile, the smoke caused by the fire may be drawn out of the work area and expelled with great force through the exhaust of the air moving and filtration machine to an area outside the work area. This area may be inside a building within which the enclosure is erected, thereby spreading smoke to different areas of the building.

In the event that a fire is started outside the work area, the air moving and filtering unit may pull smoke and fire into the work area, thus increasing the spread of the fire and smoke.

Various methods and systems for controlling conditions associated with a fire, such as smoke and temperature detection systems, are known. For example, U.S. Pat. No. 4,637,473 describes a fire suppression system for a housing that receives and filters particulate matter. Upon detection of a predetermined temperature difference between the inlet and outlet, a control circuit closes a damper and deactivates a blower motor drawing air through the housing. U.S. Pat. No. 4,363,031 discloses a smoke detection system having a wireless transmitter that sounds a local alarm and transmits signals to other smoke detectors that, in turn, re-transmit the signal and sound local alarms. U.S. Pat. No. 4,659,909 discloses a smoke detector mounted adjacent to an electric kitchen range for detecting smoke and interrupting electrical power to the range.

Similarly, U.S. Pat. No. 3,926,101 describes a smoke detector system for a building that automatically locks certain doors and reverses the direction of fans U.S. Pat. No. 4,063,595 discloses a fire/smoke detector for an air conditioner that, in response to a fire/smoke condition, opens a damper and forces air into the interior of a room to pressurize the room. U.S. Pat. No. 3,826,180 discloses a ventilating fan operable upon activation of a smoke detector. U.S. Pat. No. 4,177,461 discloses a smoke detector for a grain dryer including a transmitter for transmitting an alarm signal to a receiver.

In addition, U.S. Pat. No. 4,391,913 discloses a temperature sensor with a wireless transmitter that transmits signals to a receiver to control the regulation of a radiator system. U.S. Pat. Nos. 4,160,246 and 4,531,114 disclose smoke detectors with wireless transmitters. U.S. Pat. Nos. 4,276,064 and 4,675,203 disclose fire control systems for a paint spray booth and a powder spray booth, respectively.

The above-mentioned prior art fails to disclose any system or method for controlling air moving and filtering units used in conjunction with removal of hazardous particulate matter, such as asbestos.

SUMMARY OF THE INVENTION

By the present invention, one or more fire condition detection units are strategically placed, internally and/or externally, with respect to the containment area. The fire condition detection unit includes one or more sensors capable of detecting characteristics associated with a fire, such as smoke or heat. Associated with the fire condition detection unit is a radio frequency transmitter that transmits a radio frequency (RF) coded signal following the sensing of the fire characteristics. The radio frequency signal is received by a remote receiver associated with the air moving and filtering unit. Upon detection of the transmitted signal, the blower motor of the air moving unit is shut down. In one embodiment, the receiver is built into, or integral with, the air moving unit, along with associated control circuitry, and the air moving unit retains power to continue the various monitoring and alarm functions of the unit. Only the blower motor is stopped. In an alternate embodiment, the receiver is associated with a separate control box that is plugged into a conventional air moving and filtering unit. In this embodiment, upon receipt of the radio frequency signal from the remote transmitter, all of the electrical power to the air moving machine is cut off.

The air moving and filtering unit may also include a heat detector, such as a temperature sensor or rate of temperature rise sensor, mounted on or within the unit. Upon detection of an adverse heat condition, the blower motor of the unit is shut down.

Due to the possibility of interference with the transmitted radio frequency signal, the fire condition detection unit may also be connected by a transmission line, or cable, to the air moving and filtering unit. In the event that adverse conditions are detected by the sensors of the fire condition detection unit, an electrical signal is provided, via the cable, to the air moving and filtration machine to cut off power to the blower motor.

In the event that fire is visually observed before it is detected by the sensors of the fire condition detection unit, a hand-operated external controller may be carried by a worker to send a radio frequency signal directly to the receiver associated with the air filtering unit to terminate power to the blower motor. This controller may also be used to test the control system of the air moving and filtering unit.

It is an object of the present invention to generate a fire condition alarm signal upon detection of conditions indicative of a fire and to transmit such alarm signal to a receiver associated with an air moving and filtering unit to stop the blower motor of such unit, thus minimizing the spread of a fire that may exist in or about the containment area.

It is a further object of the present invention to monitor a containment area to detect a condition indicative of a fire and to transmit a radio frequency signal which is received by a radio frequency receiver of an air moving and filtering unit to terminate power to the blower motor of the unit.

It is still another object of the present invention to provide a heat detector sensor on the air filtering unit which, when activated, will terminate power to the blower motor of an air moving and filtering unit.

It is yet another object of the present invention to provide a hand-held radio frequency transmitter which, upon actuation, transmits a radio frequency signal to terminate power to the blower motor of an air moving and filtering machine.

These and other objects of the present invention, as well as many of the intended advantages thereof, will become more readily apparent when reference is made to the following description, taken in conjunction with the accompanying drawings.

DETAILED DESCRIPTION OF A PREFERRED EMBODIMENT

Figure 1:
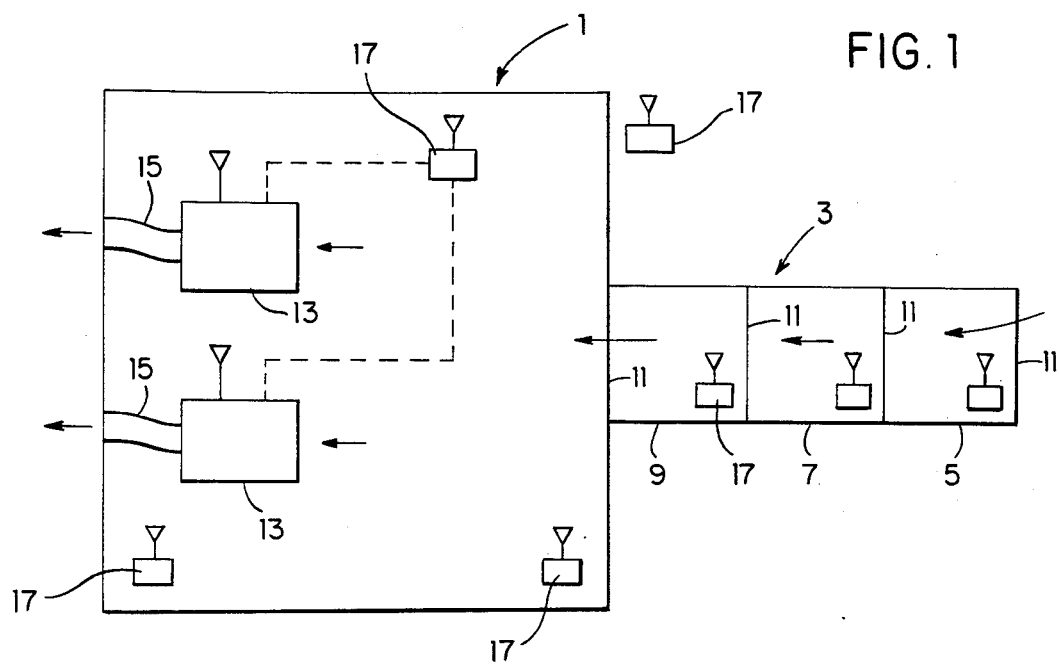
FIG. 1 is a plan view of a containment area/decontamination chamber with the fire condition detection system of the present invention.

With reference to FIG. 1 of the drawings, a work area, or containment area, 1 is shown in plan view. Associated with the containment area is a decontamination chamber 3 which typically consists of a clean room 5, a shower room 7 and an equipment or dirty room 9. Entranceways 11 are provided as a means of exit and entrance for a worker through the three chambers of the decontamination chamber and into the containment area. As described in U.S. Pat. No. 4,604,111, each of the entranceways may include an opening to allow air to enter into the containment area 1 through the decontamination chamber 3, which openings include flaps to define a flap seal as is described in greater detail in the above-mentioned patent.

The containment area 1 is created to encompass an area in which hazardous particulate matter, such as asbestos, is to be removed. For example, asbestos in the ceiling of a room may require removal. In conducting the removal operation, the containment area 1, defined by the existing walls of the room and/or plastic sheeting, provides a substantially sealed environment in which the asbestos removal is to take place. As is described in U.S. Pat. No. 4,604,111, air moving and filtering devices 13 are provided which draw relatively high volumes of air into the containment area, preferably through the openings (not shown) within the entranceways 11 of the decontamination chamber, which air moving units filter and then exhaust the air, through exhaust ducts 15, to the area outside of the containment area. By using such air moving and filtering units, a negative air pressure is created within the containment area 1, thus preventing any airborne contaminated particles from escaping the containment area. The air moving and filtering units also serve to cleanse the work area by filtering out airborne particulate matter. The filtered air is then exhausted outside the containment area. In certain instances, the air moving and filtering units 13 may be exhausted directly into the containment area, although such is not preferred. In some cases, due to space limitations, the air moving and filtering units 13 may be located outside the containment area with suitable inlet ducts connected from the inlet of the air filtering unit through the walls of the containment area 1 thus drawing air from the containment area through the filtering media within the air filtering units 13. The above procedures are generally described in U.S. Pat. No. 4,604,111.

In the present invention, one or more fire condition detectors, or detection units, 17 are strategically located or situated at various places within the containment area, outside the containment area, and within the decontamination chamber. These fire condition detectors 17 are mounted on the walls or ceiling, not unlike typical smoke detectors, and include various sensors for detecting conditions typically associated with a fire. The fire condition detector units communicate with receivers associated with the air moving and filtering units 13 to signal the units to cease drawing air when a fire condition is detected. The operation of the fire condition detectors 17 will be described more fully below.

Figure 2:
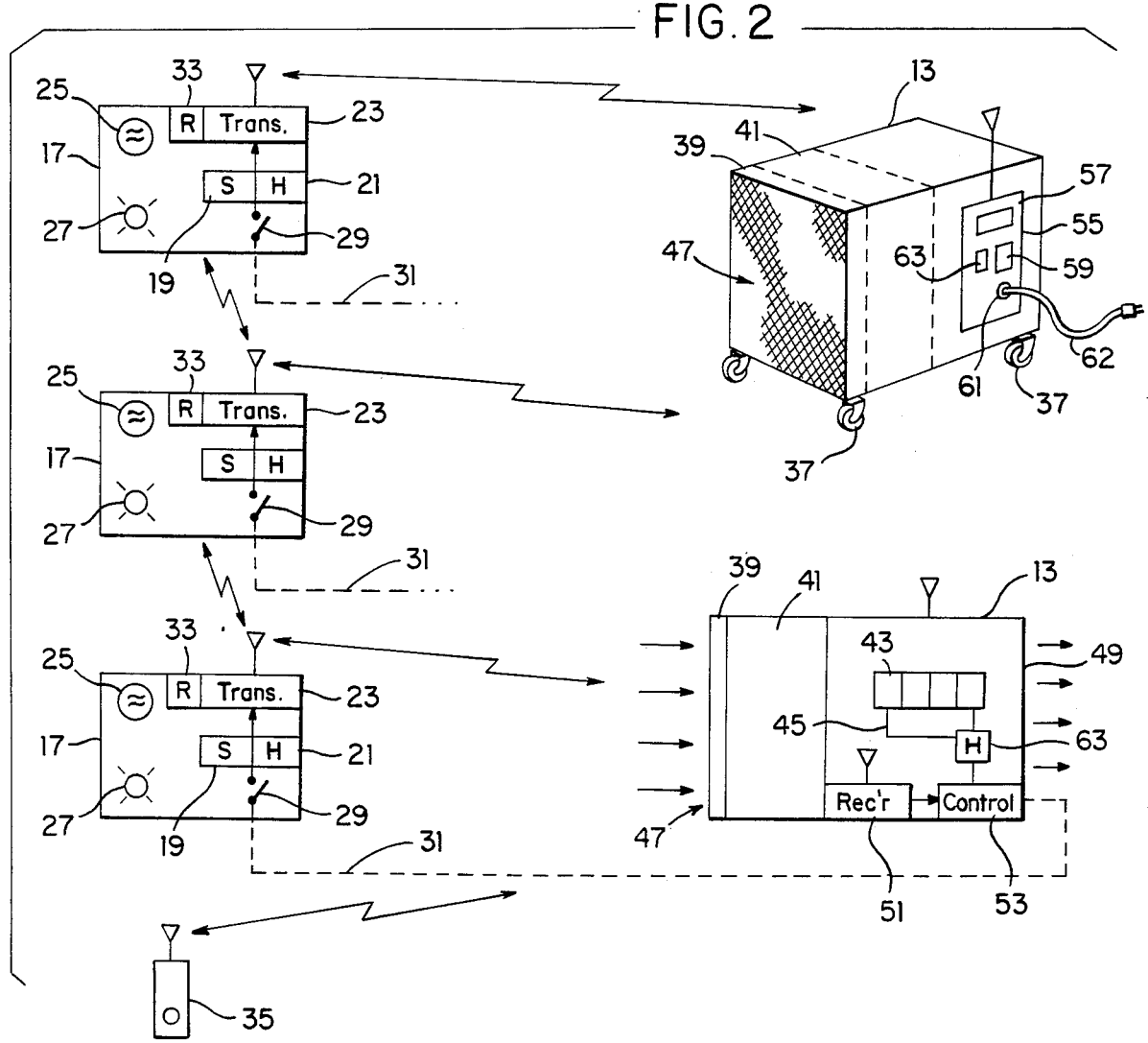
FIG. 2 is a schematic drawing of the fire condition detection and control system of the present invention showing the fire condition detection units and the air moving and filtering units.

As depicted in FIG. 2, the fire condition detectors 17 include a housing having a smoke sensor 19 and a eat sensor 21 therein. The smoke sensor 19 may include, as is well known in the art, an optical smoke sensor or an ionization type smoke sensor. The heat sensor 21, also well known in the art, may be a temperature sensor which is activated whenever the ambient temperature exceeds a predetermined value, such as 130° F., or may be a rate of rise detector which is activated when the temperature rise exceeds a certain value within a certain amount of time. Both such sensors are well known.

The sensors 19 and 21 are connected to a radio frequency transmitter 23 which, when activated, transmits an RF encoded signal representative of a fire condition. Such transmitters, used in combination with conventional smoke detectors, are well known in the art. The transmitters 23 may include a solid state switch (not shown) which is activated upon sensing of the fire condition by the sensors 19, 21, to cause transmission of the RF fire condition alarm signal. The switch may be a time-delay switch (not shown) which delays transmission of the RF fire condition alarm signal for a predetermined time following the sensing of the fire condition by the sensors 19, 21. The detector unit 17 may also include an audible alarm signal generating unit 25 and a visual display 27, both of which are conventional in the smoke detector art.

Associated with the fire condition detection unit 17 is a solid state switch or relay 29, such as an optically isolated transistor. Upon detection or activation by the sensors 19, 21, the switch 29 is subsequently closed to provide a signal over a transmission line or cable 31 which is connected to the air moving and filtering unit 13. (Although only one transmission line 31 is shown connected from a single detector 17 in FIG. 2, in practice, each of the detectors 17 is connected to each of the air moving and filtering devices 13 that are associated with the containment area 1.) The signal transmitted over the line 31 is a voltage signal representative of a logical one, or high, state. The solid state switch 29 may be a time-delay switch which is closed a predetermined time following the initial sensing of fire condition, and so long as the sensed condition is maintained.

Thus, in operation, when a condition associated with a fire arises in an area near one of the detection units 17, the smoke sensor 19 and/or the heat sensor 21 will be activated to enable the transmitter 23 to transmit, via an RF signal, a fire condition alarm signal which is detected by the air moving and filtering units 13, in a manner to be described below. This RF transmission may occur a predetermined time after the sensors 19, 21 sense the abnormal fire condition, and so long as the abnormal condition is sensed. At the same time, a solid state 29, which may be a time delay switch, is closed to provide a logical one state signal over transmission line 31 which, in turn, is connected to the air moving and filtering device 13 in a manner to be described.

Various combinations of sensors and transmission signals can be provided. For example, as shown in FIG. 2, each detection unit 17 includes a single smoke sensor 19 and a single heat sensor 21. Only one of these sensors are necessary. A manual switch may be provided on the detection unit 17 to select which of the sensors, i.e., the smoke sensor 19 or the heat sensor 21, is to be used. Alternatively, both sensor may be employed, and the detection unit 17 may include a relatively simple logic circuit that enables activation of the transmitter 23 when both sensors are activated or when only one of the two sensors are activated. Still further, as is shown in FIG. 2, the detection unit 17 enables the RF transmitter 23 to transmit an RF signal indicative of an alarm condition simultaneously with the transmission of an alarm signal over the cable 31. It should be apparent, however, that only one or the other modes of transmission may be employed for any given detection unit. Further, the detection unit 17 could be readily modified whereby only the smoke sensor 19 activates the RF transmitter 23, whereas the heat sensor 21 is employed to send the alarm signal over cable 31. Still further, it is contemplated that the sensing portion of the detection unit 17 may include both optical and ionization type smoke sensors and both temperature and rate of rise type of heat sensors. Thus, four sensors may be provided to detect a fire condition. Manually activated switches (not shown) could be provided on the detection unit 17 to enable the installer of the equipment to select one or more of these four sensors for use at any given job site. Moreover, logic circuitry may be provided within the detection unit 17 so as to activate the transmitter 23 and/or the relay switch 29 when any one, two, three, or all four of the sensors are activated. The design of such logic circuitry is well-known to those skilled in the electronics art.

Because the range of typical RF transmitters used in conventional smoke detectors are relatively limited, the coverage of large containment areas may require the inclusion of repeaters 33 within each detection unit 17, which are adapted to receive RF transmissions from other detection units 17. These repeaters 33 will receive the transmitted signal from detection units that are within its range, and retransmit or repeat the detected transmission, which repeated signal may be detected by other detection units 17 and, ultimately, the air moving and filtering units 13.

Hand-held portable transmitter units 35 are provided to transmit a signal at the same frequency as that of the transmitters 23. These portable units are carried by operators who, if a fire is observed but not yet detected by a detection unit 17, can transmit an encoded RF signal for reception by the air moving and filtering units 13. Thus, for example, if an operator is outside of the building and notices that a fire has started, the operator can manually activate the transmitter 35, by push buttons similar to a conventional garage-door opener, to transmit the RF signal for reception by the air moving and filtering devices 13 which are located within the containment area 1. The hand-held transmitters 35 also provide a means for checking the operation of the units 13.

The air moving and filtering units 13 share many of the same characteristics with conventional prior art air moving and filtering units of the type described in U.S. Pat. No. 4,604,111. As shown in FIG. 2, the air moving and filtering units 13 are typically portable units mounted on wheels 37 and include filter media such as a pre-filter 39 and a high efficiency particulate filter (HEPA filter) 41. Within the casing of the unit 13 is a fan or blower 43 operable by an electric motor 45 which serves to draw contaminated air through the inlet 47 of the unit 13, which air is filtered by the pre-filter 29 and the HEPA filter 41 and expelled through an outlet 49 of the unit 13. The outlet may be connected with suitable duct work 15 (as shown in FIG. 1) to be connected through the walls of the containment area 1 and to the outside of the containment area. Thus the air moving and filtering unit provides for moving relatively high volumes of air into and through a containment area, filtering the air, and exhausting the air to an area outside the containment area.

The air moving and filtering unit 13 as modified by the present invention includes a receiver 51 which is adapted to receive the radio frequency signals transmitted by remote transmitters 23 of the remote detection unit 17. When the receiver 51 detects the fire condition alarm signal transmitted by detection unit 17 (or the hand-held transmitter 35), a solid state relay or switch (not shown) within the receiver 51 is closed to provide a logical one or high state signal to control circuitry 53 included within the air moving and filtering unit 13. (The control circuitry 53 will be described below.) The solid state switch or relay within the receiver 51 may be a time-delay switch which is closed a predetermined time after receipt of the RF transmission, provided the transmission is maintained over the predetermined time period. Also connected to the control circuitry 53 is the transmission line or cable 31 from the remote detection unit 17. As was discussed above, a logical one, or high, state fire condition alarm signal is transmitted over the transmission line or cable 31 and provided to the control circuitry 53.

The control circuitry 53 is housed in a box having a front face that forms a control panel 55 situated on a side of the unit 13. The control panel 55 includes a visual display unit 57 for displaying messages, a key-pad 59 to allow entry of information by the operator, as will be described below, and a plug outlet 61 adapted to be connected to a cable 62 to provide a power source for both the control unit 53 and the blower motor 45. Also provided on the control panel is a heat sensor 63 which may be a temperature sensor or a rate of temperature rise sensor similar to that described with reference to the detection unit 17. This sensor 63 is directed toward the interior of the unit 13 and is intended to be within the air stream, adjacent the HEPA filter 41, to sense heat conditions within the unit. Alternatively, the sensor 63 may be directed toward the exterior of the unit 13 to sense the ambient temperature conditions around the unit 13. In either case, if the temperature rises in excess of a particular value, or, in the case of a rate of rise detector, the temperature rises at a particular rate, a logical one or high state signal is provided to the control circuitry 53, in a manner as will be described.

Figure 3:
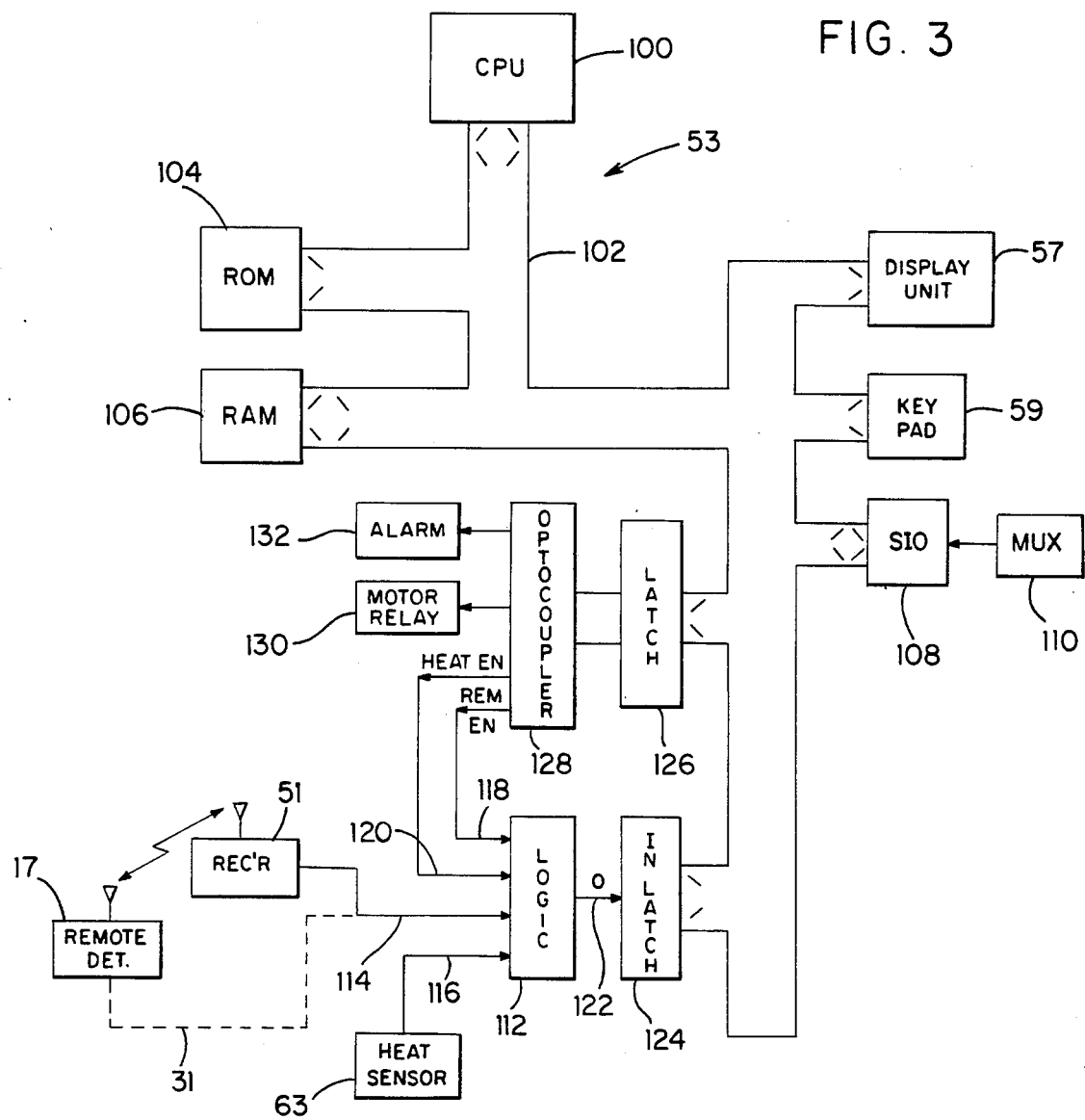
FIG. 3 is a schematic drawing of the electrical control system of the air moving and filtering unit.

The control circuitry 53 for controlling the air moving and filtering unit 13 is shown in FIG. 3. As shown, the electronic control system includes a central processing unit (CPU) 100, such as a Zilog Z80 processor, connected via a conventional data/address bus 102 to the various input and output elements, as will be described. Coupled to the CPU 100 via the data/address bus 102 is a read-only memory (ROM) 104 to provide program instructions and to store various predetermined system values. The read-only memory may be a 16K×8 memory. Also coupled with the CPU, via the bus 102, is a random access memory (RAM), such as a battery-powered random access memory 106, having an 8K×8 capacity.

A display unit 57 is connected to the bus 102. Such display unit may be an alphanumeric plasma display unit which provides for alphanumeric characters to be displayed for visual read-out. The CPU, in accordance with program instructions, writes to the display unit to display various messages.

Also connected to the bus 102 is the key pad 59, which includes a plurality of key pad switches (not shown) to provide input information which is read by the CPU 100.

Also connected to the bus 102 is a serial input/output controller (SIO) 108, which converts data over the data/address bus 102 into a serial output which may be provided, via a multiplexer 110, to a central processor or controller (not shown). Each air moving and filtering unit 13 may thus be under the control of a central controller. If, for example, an alarm or shut-down condition is detected by one of the air moving and filtering units 13, a signal is provided, via the SIO and multiplexer, to the central controller, and the operator of the central controller may communicate with other air moving and filtering units to shut them down, in the event they are still in operation. This, of course, could also be accomplished automatically by the central controller.

The control circuitry 53 includes a logic circuit 112 which has an input 114 to receive signals indicative of an alarm condition as received by the receiver 51 within the air moving and filtering device 13, or directly from the remote fire condition detection unit 17 via the transmission line 31. The logic circuit 112 is designed, as will be described below, such that a logical high or one state signal over line 114 is indicative of an alarm condition. The logic circuit 112 also receives a line 116 from the heat sensor 63 that is mounted on or within the cabinet of the air moving and filtering unit 13. When a high temperature or high rate of rise is detected by the heat sensor 63, a logical one or high state signal is provided over line 116. Also connected as inputs to the logic circuit 112 is a remote enable signal over line 118 and a heat enable signal over line 120. As will be described below, these signals are provided to enable the logic 112 to accept either signals initiated from the remote detection unit 17 (via either the receiver 51 or line 31) on line 114 or from the heat sensor 63 on line 116.

If the logic circuit detects an alarm condition, a logical zero or low state signal is provided over the logic output 122 and to an input latch 124 to the data/address bus 102. The provision of this signal to the data/address bus 102 interrupts the CPU 100, which then, via the program instructions stored in ROM, detects an alarm condition. The CPU 100 then writes to an output latch 126. The output latch 126 is coupled to an optocoupler 128, which is a conventional optical isolator. The optocoupler 128 is connected to a switch or relay 130 of the blower motor 45. The relay 130 is opened, and all power to the blower motor is disconnected. At the same time, an audible alarm unit 132, which is mounted within the casing of the unit 13, is activated to provide an audible alarm signal.

The optocoupler 128 also includes output lines 118 and 120 to provide the remote enable and heat enable signals, respectively, to the logic circuit 112. In normal operation, the system is programmed to provide for logical high, or one, state signals to be provided to the lines 118 and 120. These signals enable detection of the heat sensor 63, the receiver 51, and the input over line 31. If one wants to disable the heat sensor 63 or the receiver 51 (or cable 31), the operator can, via the key pad 59, provide such disabling information which is read by the CPU and which, in turn, writes a logical zero or low state signal to the respective lines 118 and 120 via the latch 126 and the optocoupler 128.

Figure 4:
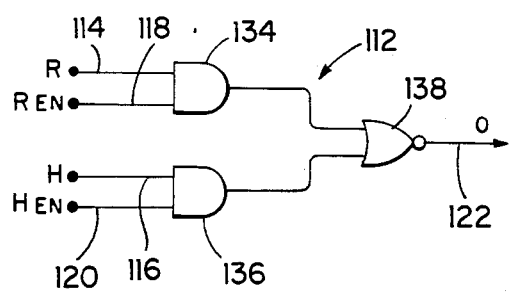
FIG. 4 is a diagram of the logic circuit element of FIG. 3.

The logic circuit 112 is depicted in FIG. 4. An AND gate 134 is provided having two inputs, one from line 114 and the other from line 118. AND gate 136 is provided also having two inputs from lines 116 and 120. If lines 118 and 120 are in their high state, as would be the case for normal operation when both detection systems are enabled, the detection of an alarm condition by the receiver 51 or via the cable 31 from the remote detection unit 17, causes a signal to be provided over line 114. The output of the AND gate 134 is thus high and is provided by an input to a NOR gate 138. The output of the NOR gate is thus 0, indicative of an alarm condition. Similarly, if a logical high state signal over line 116 from the heat sensor 63 is detected, and the heat enable input is at a logical one state, the AND gate 136 is enabled, the output of which is provided to the input of NOR gate 138 and which, in turn, provides a logical zero signal to the input latch 124 over line 122. Thus, it can be seen that an alarm condition signal will be provided, via the input latch 124, to the data/address bus 102, if either of the AND gates 134, 136 are asserted.

By way of example, let us assume that both the remote detection and the local heat detection units are enabled; that is, assume that a logical high state signal is provided over lines 118 and 120, the "normal" condition, unless altered by the operator via the key pad 59. If a fire condition alarm signal is received from the remote detector 17, either by the receiver 51 or through the transmission line 31, the logic circuit 112 provides a low state signal over its output 122, which, via the input latch 124, is read by the CPU 100, indicative of an alarm or shut-down condition. If the heat sensor 63 mounted in the air filtering unit 13 is activated, the logic circuit 112 would also provide a logical low state signal over line 122, which is read by the CPU 100. The program is then interrupted, and the CPU reads, via the input latch 124, that an alarm condition exists and, in turn, shuts down the motor relay 130 via the optocoupler 128 and latch 126. Further, an audible alarm 132 is activated. Still further, the CPU may write to the display unit 57 to visually display a message indicative of the existence of an alarm condition. The CPU may also write, via the SIO 108 and multiplexer 110, to a central processing unit which may, either automatically or by the operator of the central unit, deactivate other air moving and filtering units 13. Once the motor relay 130 is shut down, the unit may be reactivated by manual input via the key pad 59.

Figure 5:
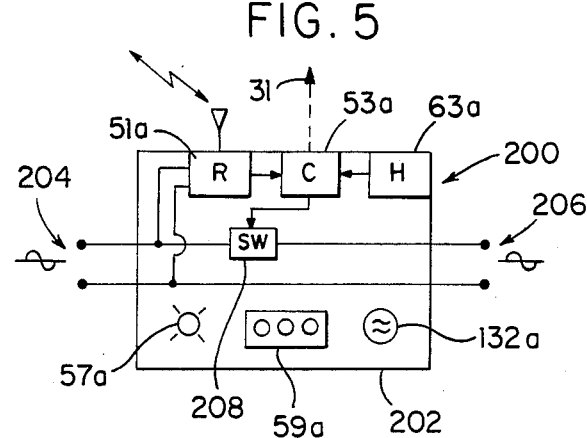
FIG. 5 is a schematic drawing of the control box for use with a conventional air moving and filtering unit.

The above system is described with respect to an air moving and filtering device where the control circuitry is incorporated within the unit. However, conventional prior art-type air moving and filtering units may be adapted to be operable with remote fire condition detection units 17 through the use of a separate control unit 200, as depicted in FIG. 5. The control unit 200 includes a housing 202 having an AC inlet plug 204 and an outlet plug 206. The inlet plug 204 is adapted to be connected via a cable to an AC outlet, whereas the outlet plug 206 may be connected, via a cable, to the power inlet plug, such as plug 61, of a conventional air moving and filtering unit. A switch or relay 208 is provided in the line connecting the inlet 204 to the outlet 206. This switch, or relay, such as a solid state relay, is normally closed. When an alarm condition is detected, the relay or switch 208 is opened, and all power to the air moving and filtering unit is disconnected.

The control unit 200 includes a receiver 51a, a heat sensor 63a, and control circuitry 53a, which are analogous to the receiver 51, heat sensor 63, and control circuitry 53 as discussed above. Connected to the control circuitry 53a is a transmission line 31 from the remote fire condition detection unit 17. Thus, when the receiver 51a detects an alarm condition, the control circuitry 53a activates the switch 208 (instead of the motor relay 130, as was described with respect to FIG. 3) to open the switch 208 and thus disconnect all power to the air filtering unit. Similarly, when the heat sensor 63a mounted on the control unit 200 detects a high temperature or high rate of rise of temperature, the heat detector 63a activates the control circuitry 53a, which also opens the switch 208. The control circuitry 53a also operates under control of signals received over transmission line 31.

It should be apparent that the control circuitry 53a need not be microprocessor-controlled and thus need not be identical to the control circuitry 53 as shown in FIG. 3. For example, the control circuitry may be an electronic latch circuit that, in response to activation signals from the receiver 51a, the transmission line 31, or the heat sensor 63a, opens the switch, or relay, 208.

The control unit 200 may also include a key pad or other similar switches 59a which are analogous to the key pad 59, as described with respect to FIG. 3. Similarly, the control unit includes an audible alarm 132a and a visual alarm or display unit, 57a, which is activated when an alarm condition is detected. Thus, the control unit 200 provides an economical method of retrofitting conventional air moving and filtering devices by simply plugging the control unit 200 in the AC inlet of the conventional air moving and filtering units.

Having described the invention, many modifications thereto will become apparent to those skilled in the art to which it pertains, without deviating from the spirit of the invention as defined by the scope of the appended claims.

We claim:

1. A system for controlling airborne contamination of particulate matter, such as airborne asbestos fibers, said system comprising:
    a substantially sealed containment area,
    at least one air moving and filtering unit, having a blower motor therein, associated with said containment area for moving relatively high volumes of air into and through said containment area, filtering the air and exhausting the air to an area outside said containment area,
    a fire condition and control system including
    fire condition sensing means for sensing characteristics of a fire, such as smoke or heat, outside of said at least one air moving and filtering unit;
    transmission means for transmitting a fire condition alarm signal upon activation of said fire condition sensing means;
    remote receiving means for receiving the fire condition alarm signal, said receiving means associated with said at least one air moving and filtering unit; and
    control means for disabling the blower motor of said at least one air moving and filtering unit upon receipt of the fire condition alarm signal by the receiving means to terminate further movement of relatively high volumes of air into and through said containment area.

2. The system of claim 1 wherein said transmission means includes means for wireless transmission of a radio frequency signal.

3. The system of claim 1 wherein said transmission means includes means for transmitting a fire condition alarm signal over a transmission line.

4. The system of claim 1 further comprising heat sensing means associated with each air moving and filtering unit for sensing a heat characteristic, such as temperature, and for providing a heat alarm signal when the heat characteristic is sensed, said control means responsive to said heat alarm signal for disabling the blower motor of the air moving and filtering unit.

5. The system of claim 1 further comprising portable, manually controlled transmission means for transmitting a fire condition alarm signal.

6. The system of claim 1 wherein said fire condition sensing means includes an audible alarm means activated upon detection of a fire condition within the containment area.

7. The system of claim 1 wherein said transmission means includes a delay means for delaying the transmission of the fire condition alarm signal for a predetermined time period following activation of said fire condition sensing means.

8. A fire condition detection and control system for air moving and filtering units comprising:
- a fire condition unit including a housing, fire condition sensing means associated with said housing for sensing a condition indicative of fire, such as smoke or heat, transmission means associated with said housing for transmitting a fire condition alarm signal following activation of said fire condition sensing means; and
- a remote air moving and filtering unit including a housing having an air inlet and an air outlet, filter means within said housing for filtering air drawn through said air inlet, a blower means for drawing air through said air inlet and through said filter means and for expelling filtered air through said air outlet, receiver means for receiving the fire condition alarm signal as a result of a condition indicative of a fire sensed outside of said remote air moving and filtering unit, and control means for disabling the blower means upon receipt of the fire condition alarm signal.

9. The system of claim 8 wherein said air moving and filtering unit further comprises temperature sensing means for sensing abnormal temperature conditions and for activating said control means upon such sensing.

10. The system of claim 9 wherein said air moving and filtering unit further comprises manual input means for selectively disabling said receiver means and temperature sensing means.

11. The system of claim 8 wherein said air moving and filtering unit further comprises audible alarm means for emitting an audible alarm upon disabling of said blower means.

12. The system of claim 8 wherein said control means includes a switch means connected with said blower means, said switch means operable to disconnect electrical power from said blower means upon receipt of the fire condition alarm signal.

13. The system of claim 8 wherein said transmission means includes means for wireless transmission of the fire condition alarm signal.

14. The system of claim 8 wherein said transmission means includes means for transmitting the fire condition alarm signal over a transmission line, said transmission line connected with said air moving and filtering unit.

15. The system of claim 8 wherein said remote air moving and filtering unit is within a substantially enclosed containment area for controlling airborne contamination of particulate matter, such as airborne asbestos fibers.

16. A fire condition detection and control system for use with air moving and filtration units having an electrically-powered blower motor associated therewith, the system comprising:
- a fire condition detection unit including a fire condition sensing means for sensing characteristics of a fire, such as smoke or heat, outside of the air moving and filtration units, and transmission means for transmitting a fire condition alarm signal following activation of said fire condition sensing means; and
- a control unit including an electrical inlet means for receiving a source of electrical power, an electrical outlet means for providing electrical power from said inlet to an outlet, said outlet adapted to be connected with an air moving and filtering unit, switch means for interrupting the electrical path between said inlet and said outlet, receiver means for receiving the fire condition alarm signal when fire is sensed outside of the air moving and filtering units, and control means for activating said switch means to interrupt the electrical path between said inlet and said outlet upon receipt of the fire condition alarm signal by said receiver means.

17. The system of claim 15 wherein said transmission means includes means for wireless transmission of the fire condition alarm signal.

18. The system of claim 15 wherein said transmission means includes means for transmitting the fire condition alarm signal over a transmission line, said transmission line connected with the receiver means of said control unit.

19. A system for establishing controlled conditions for removal of asbestos materials from an existing building, said system comprising:
- a substantially sealed containment area within a building from which asbestos material is to be removed;
- at least one air moving and filtering unit for moving and filtering high volumes of air within said containment area; and
- a fire condition detection and control system for sensing characteristics of a fire, such as smoke or heat, at a location remote from said at least one air moving and filtering unit, and for disabling said air moving and filtering unit upon detection of a fire condition to terminate the movement of said high volumes of air in the containment area.

20. The system of claim 19 wherein said air moving and filtering unit filters airborne asbestos contamination from the air.

21. The system of claim 19 wherein said fire condition and detection system is within said containment area.

22. The system of claim 19 wherein said fire condition detection and control system includes a wireless transmission means for transmitting a disabling signal to said air moving and filtering unit.

23. The system of claim 19 wherein said fire condition detection and control system includes a transmission line connected with said air moving and filtering unit.

* * * * *